United States Patent

[11] 3,629,815

[72] Inventor: Peter Hattwig, Heidelberg, Germany
[21] Appl. No.: 16,013
[22] Filed: Mar. 3, 1970
[45] Patented: Dec. 21, 1971
[73] Assignee: Teldix G.m.b.H., Heidelberg, Germany
[32] Priority: Mar. 4, 1969
[33] Germany
[31] P 19 10 904.7

[54] OPTICAL-WARNING SYSTEM FOR VEHICLE BRAKES
7 Claims, 1 Drawing Fig.

[52] U.S. Cl. ............................................. 340/52 B, 340/262
[51] Int. Cl. ............................................. B60t 8/10
[50] Field of Search ............................................. 340/52, 52 B, 62, 66, 87, 262; 303/21 R, 21 CG, 21 BB, 21 CF

[56] References Cited
UNITED STATES PATENTS

| | | | |
|---|---|---|---|
| 3,507,544 | 4/1970 | Wakamatsu et al. | 303/21 CG |
| 2,927,302 | 3/1960 | Steigerwald | 340/52 |
| 3,364,384 | 1/1968 | Dankert | 340/62 |

Primary Examiner—Thomas B. Habecker
Assistant Examiner—Howard S. Cohen
Attorney—Spencer & Kaye ABSTRACT: A system for providing an optical-warning indication to persons behind a motor vehicle equipped with a brake control system which prevents locking of the wheels thereof during braking showing that the antilocking control system has been actuated. The optical-warning system provides for two different indications, one when the normal braking action has been initiated and a second when the antilocking control system has been actuated.

PATENTED DEC 21 1971 3,629,815
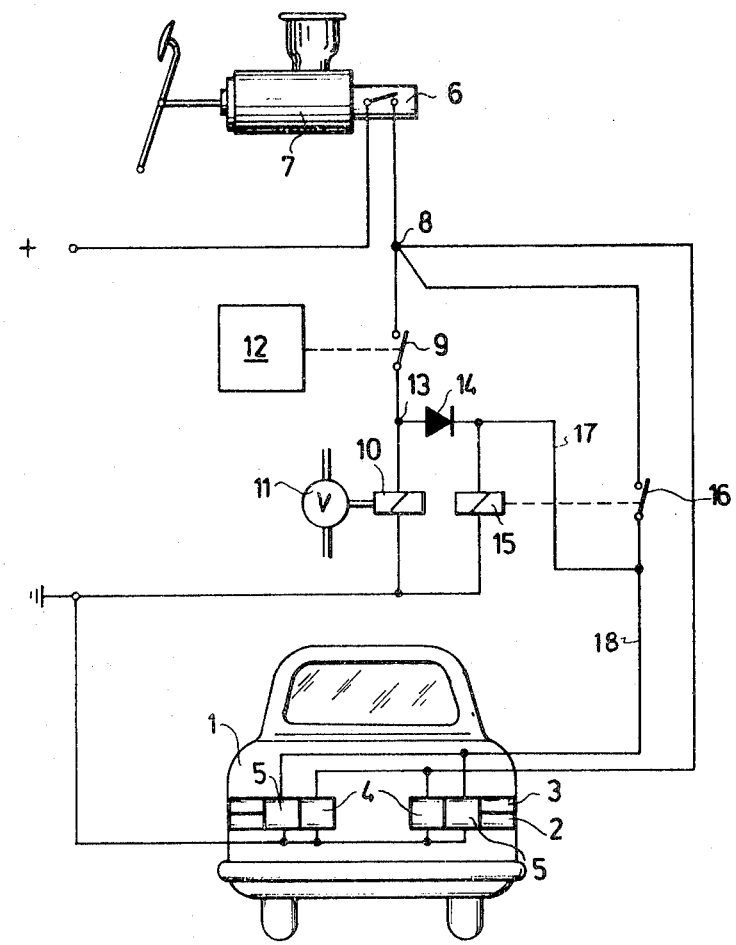
INVENTOR.
Peter Hattwig
BY
Spencer & Kaye
ATTORNEYS.

OPTICAL-WARNING SYSTEM FOR VEHICLE BRAKES

BACKGROUND OF THE INVENTION

The present invention relates to an externally visible optical-warning system for motor vehicles which operates automatically during braking and is visible to persons or traffic behind the vehicle. The warning indications of such systems, which are usually constructed in the form of brake lights, give the traffic behind the vehicle an early indication that the preceding vehicle is slowing down and might possibly come to a stop.

With the expected increase in the use of antilocking control systems for vehicle brakes, a new problem arises. Such antilocking control systems permit greater decelerations for the vehicles than is possible without such brake control systems and give the vehicle the ability to remain true in its track. Thus very sudden braking maneuvers become possible under road conditions where a driver in a vehicle without an antilocking control system could brake only with the utmost care. Under such conditions, the driver of a vehicle not equipped with an antilocking brake-control system is thus particularly liable to react with fear when the drive in front of him puts on his brakes. It is therefore desirable to indicate to the traffic behind a vehicle equipped with an antilocking brake-control system, that the driver ahead uses such a system and that therefore an extremely strong deceleration of this vehicle must be expected in the direction of travel.

Antilocking control systems always also comprise a measuring device for monitoring critical, i.e., particularly rapid, changes in the rotational speed of at least one vehicle wheel in order to automatically initiate a reduction in the brake pressure when locking of the brakes is imminent. The present invention therefore more particularly relates to motor vehicles which are provided with an optical brake warning device and such a monitoring device or, more generally, an antilocking control system.

SUMMARY OF THE INVENTION

To solve the above-described problem, according to the present invention, the optical-warning indicator is constructed in such a manner that it can provide two different warning states as concerns its information character and that it is functionally connected with the monitoring device so that the second warning state is automatically actuated when the critical changes in the rotational speed are detected. Thus, when a drive notices the change from the first to the second warning state in the vehicle ahead or when he notices the second warning state at all, he knows that the antilocking system has gone into effect and can adjust his driving accordingly. This situation may occur when the driver ahead suddenly encounters an obstacle and brakes in panic or when the roadway is unexpectedly slick. In both cases the invention counteracts the particular surprise element in the driver behind.

A number of different possibilities for design for an optical warning indicator according to the invention are possible. Accordingly, only a few embodiments are selected for discussion below.

It is proposed, for example, that the conventional vehicle brake lights be utilized for the first warning state and that additional brake lights be provided for the second warning state or the known type of particularly luminous fog tail lights can be simultaneously used as additional brake lights. Alternatively, brake lights can be provided whose luminous area, brightness, color hue or color can be changed or varied in two stages. Additionally, one warning state may be characterized by continuous operation and the other by intermittent or blinking operation of the brake lights.

With regard to the functional connection of the monitoring device with the warning indicator, it is proposed according to the invention to provide a control circuit for the warning indicator which provides the second warning state at the first occurrence of a critical, i.e., particularly rapid, change in the rotational speed during braking and maintains this state until the end of the entire braking process, i.e., until the brakes are released. The above-discussed monitoring devices often contain contacts of semiconductor switching elements which close a circuit when such extraordinary changes in the rotational speed occur. In such a case, it is easiest to connect a holding relay which controls the additional brake lights into this circuit and to tap the holding current for the relay at the normal vehicle brake light switch so that at the end of the braking process, when the brake light switch opens, the current to the holding circuit is cut off and the relay is deenergized.

The second warning state may also be controlled in dependence on a suitable valve of the antilocking control system which might possibly be the easiest way to initiate intermittent operation of a second brake light.

BRIEF DESCRIPTION OF THE DRAWINGS

The FIGURE illustrates one embodiment of an optical brake warning system for a vehicle according to the invention.

DESCRIPTION OF THE PREFERRED EMBODIMENT

Referring now to the figure there is shown a vehicle 1 having on the rear thereof in addition to the tail lights 2 and the directional blinkers 3 two conventional brake lights 4 and two additional brake lights 5. The electrical circuit for the normal brake lights 4 extends from the positive pole or terminal of the vehicle power source, e.g., the battery, via the conventional light switch 6 to the negative pole of the vehicle power source indicated as ground. The opening and closing of the light switch 6 is controlled by the applied brake pressure and, as is conventional, the switch is disposed on the master cylinder 7 of the brake system. Between the brake light switch 6 and the normal lights 4 is disposed a branch point or common terminal 8. Connected between this branch 8 and ground is a normally open switch 9 and a magnetic coil or solenoid 10. The switch 9 which could also be a semiconductor element, e.g. a transistor, forms, together with a control device 12, which is shown only schematically, a measuring device for monitoring particularly rapid rotational decelerations of the wheel or wheels of the vehicle. The control device 12, in the simplest form, includes a mass which is spring restrained with respect to the wheel, or a shaft driven by the wheel. The device 12 could, particularly when a transistor is used for the switch 9, be an electrical arrangement, e.g. a tachometer generator driven by the wheel which furnishes a speed-proportional voltage which is electronically differentiated and which furnishes a signal when a threshold value is exceeded to close the switch 9. Another possibility is to mount a pulse generator on the wheel and via an electronic system, which counts the impulses therefrom per unit time, determines the speed of the wheel and thus the deceleration. The magnetic coil of solenoid 10 serves to electromagnetically actuate a valve 11 which is disposed in the hydraulic line system of the vehicle brakes and which in its open state produces a reduction in the brake pressure. In practice, antilocking control systems are substantially more complicated and extensive then that shown here; within the scope of this example it suffices, however, to mention only these few substantial elements which are more or less common to all antilocking brake-control systems.

Connected to a terminal or tap 13 located between the switch 9 and the magnetic coil 10 via a diode 14 is one end of a relay winding or coil 15, the other end of which is connected to ground. The normally open relay contacts controlled by the relay coil 15 are connected in series with the terminal 8, and consequently the brake switch 6, and the additional brake lights 5 across the power source of the vehicle. In order to provide a holding circuit for the relay coil 15, a lead 17 is provided connecting the junction of the diode 14 and the relay winding 15 with the lead 18 between from contacts 16 and the additional brake lights 5. The diode 14, which is oriented so that the relay coil 15 is energized to close the contacts 16 when both the brake light switch 6 and the switch 9 are closed further serves to prevent energization of the solenoid 10 after the switch 9 opens but before the brake light switch 6 is opened.

The following mode of operation results for the circuit arrangement described above: when the driver actuates his brake, the brake light switch 6 closes at a relatively low brake pressure. Thus lights 4 are initially supplied with current and produce a first indication. If the antilocking system starts to function thereafter, i.e., when the control device 12 closes contact 9, not only is the valve 11 opened but also the relay coil 15 is energized closing contacts 16, thus completing the circuit for the additional brake lights 5 to produce the second indication. Closing of the relay contacts 16 completes the holding circuit for the relay coil 15 by supplying current thereto via the lead 17, whereby the additional lights 5 continue to operate even if switch 9 opens. Only upon opening of the brake light switch 6 do all brake lights go off.

The use of two separate tail lights 4 and 5 to produce the two different indications is by way of example only and, as indicated above, other arrangements may be used. For example, a blinking control element can be inserted in the lead 18, or the lights 4 and 5 may be replaced by a single light whose brightness is varied. Accordingly, it will be understood that the above description of the present invention is susceptible to various modifications, changes, and adaptations, and the same are intended to be comprehended within the meaning and range of equivalents of the appended claims.

I claim:

1. An optical-warning system for the brake system of a motor vehicle which includes a control system for preventing locking of the motor vehicle wheels during braking, comprising:
    an optical-warning indicator means which is externally visible at the rear of said vehicle, said optical-warning means being capable of providing first and second optical indications which differ from one another;
    a first means connected to said indicator means for causing said first indication whenever the brake system is actuated; and
    a second means connected to said indicator means for monitoring the rotational speed of at least one vehicle wheel and for causing said second indication whenever a critical change in the rotational speed of the monitored wheel occurs indicating an impending locking of such wheel and the actuation of the antilocking control system, whereby observers behind the vehicle will be warned that the antilocking brake-control system has been actuated, said second means including a control circuit means for maintaining said second indication until the brake system is deactuated.

2. An optical-warning system as defined in claim 1 wherein said optical-warning means includes first and second brake light means for respectively providing said first and second optical indications.

3. An optical-warning system as defined in claim 2 wherein the vehicle is provided with particular luminous fog tail lights and wherein said second brake light means comprises said fog tail lights.

4. An optical-warning system as defined in claim 1 wherein said optical-warning means includes brake lights whose luminous surface, brightness, color hue or color can be varied in two different stages.

5. An optical-warning system as defined in claim 1 wherein said first indication is continuous and wherein said second indication is a blinking indication.

6. An optical-warning system as defined in claim 1 wherein said first means includes the normal vehicle brake light switch and wherein said control circuit means includes a self-holding relay means which is closed whenever said critical change in the rotational speed of the monitored wheel occurs, the coil of said relay means being connected so that the holding current therefor flows through said normal brake light switch.

7. An optical-warning system as defined in claim 2 wherein said first means includes the normal vehicle brake light switch, said switch being connected in series with said first brake light means across the power source of said vehicle, and wherein said second means comprises:
    a relay having its coil connected in series with a diode, a normally open switch and said brake light switch across said power source;
    said relay having a pair of normally open relay contacts connected in series with said brake light switch and said second brake light means across said power source;
    a solenoid for controlling the pressure in the brake system of the monitored wheel, the coil or said solenoid being connected in series with said normally open switch and said brake light switch across said power source;
    means responsive to the rotational speed of at least one wheel of the vehicle for closing said normally open switch whenever said critical change in the rotational speed occurs; and
    means electrically connecting said relay coil to said relay contacts for holding said relay in an energized condition after said relay has been energized by the closing of said brake switch and said normally open switch and until said brake switch is opened, said diode being oriented so that it prevents energization of said solenoid during the time said first relay coil is being held in its energized condition after opening of said normally open switch.

* * * * *